US010591131B2

(12) United States Patent
Spinger et al.

(10) Patent No.: US 10,591,131 B2
(45) Date of Patent: Mar. 17, 2020

(54) LIGHTING ARRANGEMENT WITH A SPATIALLY CONTROLLABLE REFLECTOR ELEMENT

(71) Applicant: Lumileds Holding B.V., Schiphol (NL)

(72) Inventors: Benno Spinger, Aachen (DE); Casey Israel, Brüggen (DE)

(73) Assignee: LUMILEDS HOLDING B.V., Schiphol (NL)

( * ) Notice: Subject to any disclaimer, the term of this patent is extended or adjusted under 35 U.S.C. 154(b) by 0 days.

(21) Appl. No.: 16/191,018

(22) Filed: Nov. 14, 2018

(65) Prior Publication Data

US 2019/0145600 A1 May 16, 2019

(30) Foreign Application Priority Data

Nov. 15, 2017 (EP) ...................... 17201914

(51) Int. Cl.
| F21S 41/675 | (2018.01) |
| F21S 41/153 | (2018.01) |
| F21S 41/25 | (2018.01) |
| F21S 41/365 | (2018.01) |
| F21S 41/20 | (2018.01) |
| G02B 26/08 | (2006.01) |
| G02B 19/00 | (2006.01) |
| F21S 41/663 | (2018.01) |
| F21S 41/147 | (2018.01) |
| F21Y 115/10 | (2016.01) |

(52) U.S. Cl.
CPC .......... *F21S 41/675* (2018.01); *F21S 41/147* (2018.01); *F21S 41/153* (2018.01); *F21S 41/25* (2018.01); *F21S 41/285* (2018.01); *F21S 41/365* (2018.01); *F21S 41/663* (2018.01); *G02B 19/0066* (2013.01); *G02B 26/0833* (2013.01); *F21Y 2115/10* (2016.08)

(58) Field of Classification Search
CPC ...... F21S 41/675; F21S 41/365; F21S 41/147; G02B 26/0833; G02B 19/0066
See application file for complete search history.

(56) References Cited

U.S. PATENT DOCUMENTS

| 2003/0107323 A1 | 6/2003 | Stam | |
| 2007/0211487 A1* | 9/2007 | Sormani | ............... F21S 41/285 362/545 |

(Continued)

FOREIGN PATENT DOCUMENTS

WO 2016/198329 12/2016

*Primary Examiner* — Julie A Bannan
(74) *Attorney, Agent, or Firm* — Volpe and Koenig, P.C.

(57) ABSTRACT

A lighting arrangement and a method of forming an illumination beam are described. A plurality of LED lighting elements is operable to emit light. A plurality of collimator elements is arranged to collimate light emitted from the LED lighting elements. A first projection element is arranged to project light emitted from the collimator elements onto a spatially controllable reflector element. The spatially controllable element comprises a plurality of reflector elements adjustable between a first and a second position. In the first position, the light is reflected into the direction of a second projection element to form a projected illumination beam. In the second position, light is reflected into a different direction to not contribute to the projected illumination beam.

13 Claims, 3 Drawing Sheets

(56) References Cited

U.S. PATENT DOCUMENTS

| | | | |
|---|---|---|---|
| 2008/0068856 A1 | 3/2008 | Schug et al. | |
| 2017/0282785 A1* | 10/2017 | Albou | F21S 43/40 |
| 2018/0156409 A1* | 6/2018 | Schwaiger | H01S 5/005 |
| 2019/0145601 A1* | 5/2019 | Bhakta | F21S 41/675 362/465 |

* cited by examiner

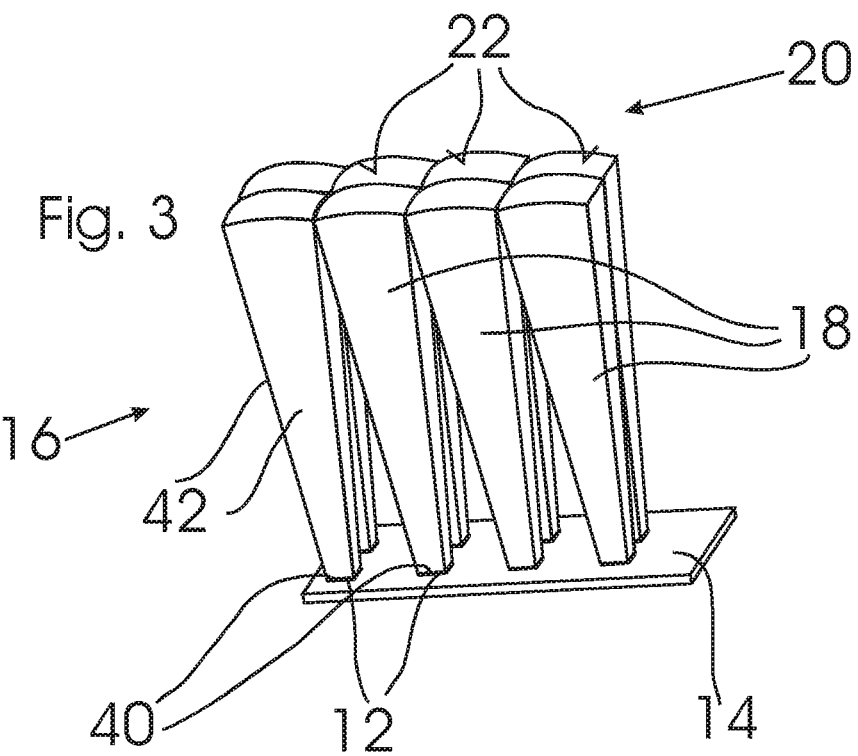
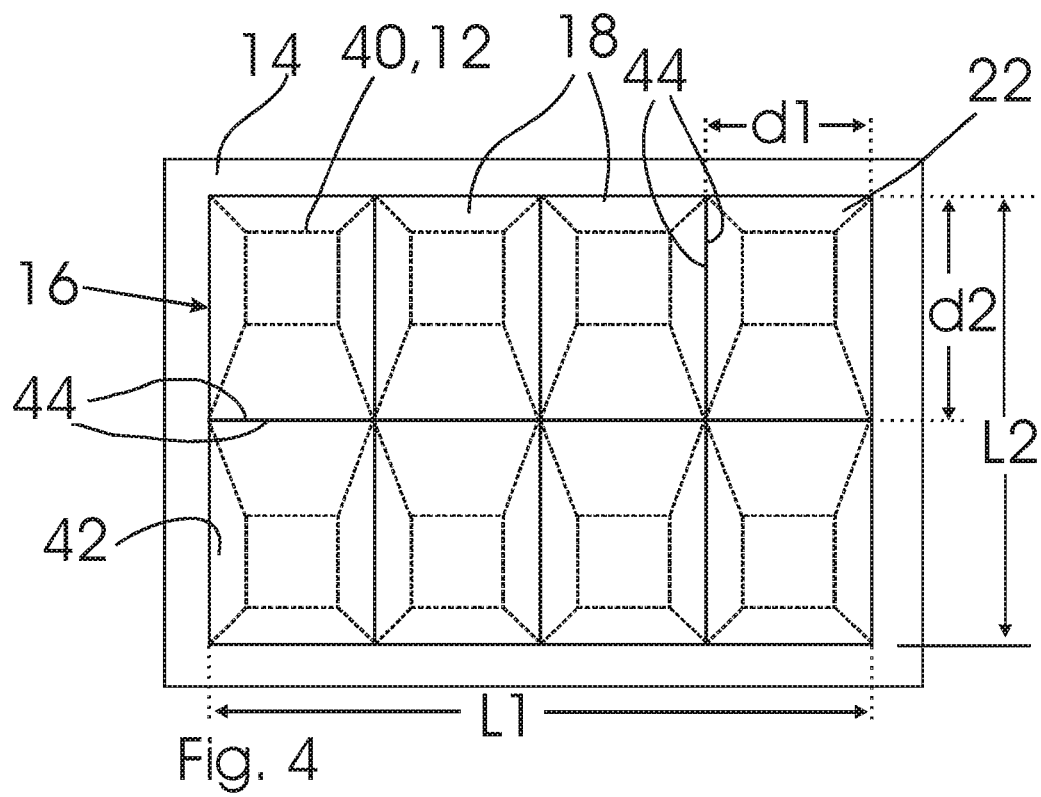

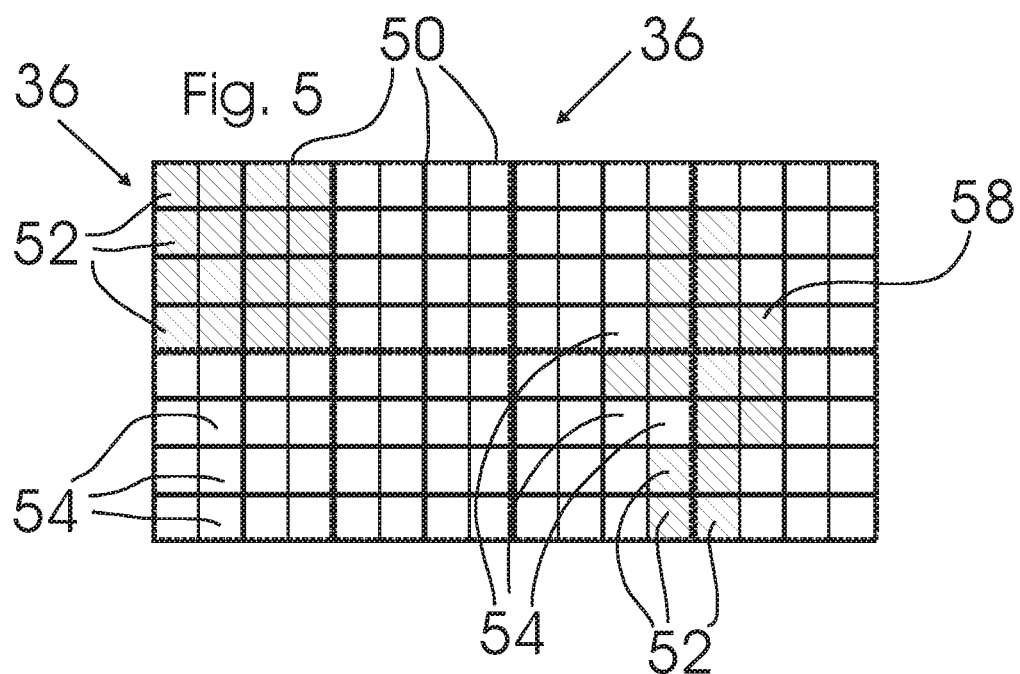
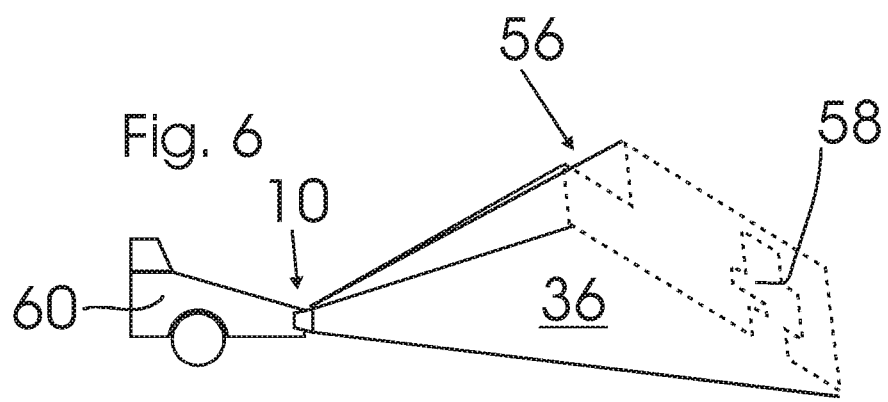

LIGHTING ARRANGEMENT WITH A SPATIALLY CONTROLLABLE REFLECTOR ELEMENT

FIELD OF INVENTION

The invention relates to a lighting arrangement and to a method of forming an illumination beam. More particularly, the invention relates to creating an illumination beam by directing light onto a spatially controllable reflector element.

BACKGROUND

Spatially controlled reflectors are used e.g. in video projectors. In digital light processing (DLP) technology, a digital micromirror device (DMD) with microscopically small mirrors arranged in a matrix on a semiconductor chip may be repositioned rapidly to create a spatially modulated illumination beam.

Use of a spatially controlled reflector has also been proposed for selective illumination purposes. US 2003/0107323 A1 describes a system for controlling an exterior vehicle light. In order to prevent glare, the vehicle light may be controlled based on the output of an array of sensors. In one embodiment, a controllable headlamp includes a light source and a spatially controlled reflector. The light source may be any type of light suitable for automotive use, such as a halogen source, HID source or light emitting diode LED source. The spatially controlled reflector contains a plurality of switchable mirrors which can be turned on and which reflect incident rays to be then protected by a lens. When turned off, incident rays are reflected away from the lens.

SUMMARY

It may be considered an object to provide a lighting arrangement and a method of forming an illumination beam which has a good efficiency and provides an illumination beam with high luminous flux and luminance.

The inventors have considered the requirements of a light source for illuminating a spatially controllable reflector element, in particular a micromirror (DMD) element. In order to achieve height luminance and flux, a single light source would require an extremely high power density, presenting significant thermal challenge. Instead of a single light source, the inventors propose a distributed light source comprised of a plurality of LED lighting elements. In order to make efficient use of the light and to adapt the light emission characteristics to the requirement of the spatially controlled reflector element, the inventors propose a combination of collimator elements and a projection element.

A lighting arrangement according to the invention comprises a plurality of LED lighting elements and a plurality of collimator elements arranged to collimate light emitted from the LED lighting elements. The term "LED element" is used here to designate any type of solid state lighting element, including light emitting diodes, organic light emitting diodes, laser diodes etc. For example, a light emitting element may be a single light emitting diode or a plurality of light emitting diodes arranged closely together, such as in known RGB LEDs. The LED lighting elements may be packaged or unpackaged, i.e. be comprised of an LED die only. Preferred are flat rectangular LED lighting elements without additional optical elements except for the collimator elements, e.g. without an additional lens, dome, etc. The LED lighting elements are preferably provided spaced from each other, e.g. in one or more directions perpendicular to the main light emission direction (which in the case of a flat LED die is normal to the LED die surface). For example, the LED elements may be arranged spaced from one another in a line or matrix arrangement, preferably with at least substantially (e.g. +/−20%, preferably +/−10%) equal distances along rows or columns.

A spatially distributed arrangement of a plurality of LED lighting elements has the advantage of distributing the thermal load, allowing to better dissipate heat generated during operation. For a preferred distribution of LED lighting elements, a distance between the LED lighting elements may be e.g. at least 50% of the width of the LED element in the same direction. Preferably, the LED lighting elements are spaced farther apart at a distance of at least 100% of the width of the LED lighting elements.

The collimator elements are arranged to receive light from the LED lighting elements and to form a collimated beam thereof. The collimator elements may each comprise reflector surfaces arranged around a main light emission direction of the LED lighting elements. While the collimator elements may in principal also be hollow with internal reflector surfaces, it is preferred to provide solid collimator elements relying on total internal reflection (TIR) at boundary surfaces. The collimator elements may e.g. be made of silicone or PMMA.

According to the invention, a first projection element is arranged to project light emitted from the collimator elements onto a spatially controllable reflector element. The first projection element may be any type of optical element suited to project the collimated light from the collimator elements onto the surface of the spatially controllable reflector element, e.g. DMD element. While this may in principle be achieved e.g. by a projection lens, a reflector with at least one reflector surface is preferred. Preferably, the reflector surface may be of concave shape. The first projection element may have a first focus on a light output surface of one or more of the collimator elements and a second focus on the spatially controllable reflector element.

The spatially controllable reflector element comprises a plurality of reflector elements adjustable between at least two positions. In preferred embodiments, a DMD device with a plurality of micromirrors may be provided. These microscopic mirrors arranged on a DMD surface may be individually addressed to be movable between a first and a second angular position.

The two positions preferably provide different reflection angles. In the first position, which may be referred to as an "on" position, light received from the first projection element is reflected into the direction of a second projection element, preferably a projection lens. A projected illumination beam is thus formed, preferably from the light of all reflector elements in the first ("on") position. In contrast, in the second position of the reflector elements, incident light from the first projection element is reflected into a different direction to not contribute to the projected illumination beam.

Thus, according to the invention, a controllable illumination beam may be formed from light emitted of a plurality of LED lighting elements. The light is collimated, projected onto the spatially controllable reflector element and, depending on the position of individual reflector elements, is then projected by the second projection element in spatially selective form.

The invention therefore allows to form an illumination beam with high luminous flux and high luminance to be generated in an efficient way by using multiple LED lighting elements. Through collimation and projection by the first projection element, a first projected beam may be formed and directed onto the spatially controllable reflector element which may be adapted to the size, aspect ratio and angular orientation thereof.

In preferred embodiments, the LED elements may be arranged on a carrier, for example a plane member, such as e.g. a printed circuit board. The LED elements may be arranged spaced from each other, e. g. in a line or arranged in a common plane. For example, the LED elements may be arranged in an array, comprising at least two parallel rows of spaced LED elements, with the two rows being arranged at a distance from each other. In preferred embodiments, the LED elements may be connected to be operable independently, i.e. that they can be turned on or off independently on the operating state of neighboring LED elements.

In particularly preferred embodiments, the invention allows to selectively control, i.e. turn on or off, different spatial portions of the projected illumination beam. On one hand, this may be achieved by controlling the spatially controllable reflector element. On the other hand, also the LED lighting elements may be individually controlled. Thus, a desired selective beam shape may e.g. be achieved by individually controlling selective one of the LED lighting elements to be either turned on or off to obtain a coarse structure, and by further controlling the shape of the coarse structure via control of the reflector elements to obtain a fine structure.

In preferred embodiments, one collimator element may be provided for each LED lighting element. The collimator elements may each comprise a light input surface arranged next to an LED lighting element. Further, the collimator elements may each comprise a light output surface arranged e.g. opposite to the light input surface. The light input surface may preferably be plane. It may further be arranged in parallel to a plane light emitting surface of an LED lighting element. The light emitting surface and the light input surface may preferably be arranged in close proximity, e.g. at a distance of 1 mm or less, preferably in very close proximity with a very small distance of 0.2 mm or less. The light output surface may e.g. be a plane surface arranged in parallel to the light input surface. In alternative embodiments, the light output surface may have a convex shape to allow better transition of light from the collimator element to the first projection element.

In preferred elements, the light output surface may be larger than the light input surface. Alternatively, or in addition thereto, the light output surfaces may have a different aspect ratio than the light input surfaces. Thus, it is in particular possible to achieve an aspect ratio well suited for projection onto the spatially controllable reflector element.

While the collimator elements may be arranged such that they form distinct light output surfaces, e.g. with a gap remaining between the individual light output surfaces, it is preferred that the light output surfaces of the individual collimator elements are arranged right next to each other to form a continuous common light output surface, without gaps in between the individual light output surfaces.

Regardless of whether the light output surface is continuous or whether gaps remain, the light output surfaces of the individual collimator elements may be considered to form a common light output surface which has a first extension in a first direction and a second extension in a second direction, preferably perpendicular to the first direction. An aspect ratio of the common light output surface may be defined as the quotient of the first and second extension. Also, the individual light output surfaces may have a first and second extension in perpendicular directions.

In some embodiments, the first extension of the individual light output surfaces may be smaller than the second extension. The light emitted from the individual light output surfaces may then preferably be projected onto the spatially controllable reflector element such that the second, larger extension may be arranged in parallel to a switching direction thereof. The switching direction may be defined as a direction perpendicular to the tilt or rotation angle of the reflector elements, e.g. micromirror elements of the spatially controllable reflector element.

Preferably, the collimator elements may be provided at least substantially with a frustum shape. From a rectangular, preferably even square light input surface, the frustum shaped collimator elements may extend up to a light output surface, which may be plane or rounded, e.g. convex. In particular, edges of the collimator element may extend from corners of the light input surface up to the light output surface.

These and other aspects of the invention will be apparent from and elucidated with reference to the embodiments described hereinafter.

BRIEF DESCRIPTION OF THE DRAWINGS

FIG. 3 shows in a perspective view LED lighting elements on a carrier and collimator elements of the headlight of FIG. 1, FIG. 2;

FIG. 4 shows a top view of the elements shown in FIG. 3;

FIG. 5 shows a schematical view of a matrix for forming an illumination beam;

FIG. 6 shows a schematical view of an illumination beam emitted from the front of a vehicle.

DETAILED DESCRIPTION OF THE PREFERRED EMBODIMENTS

Figure 1:
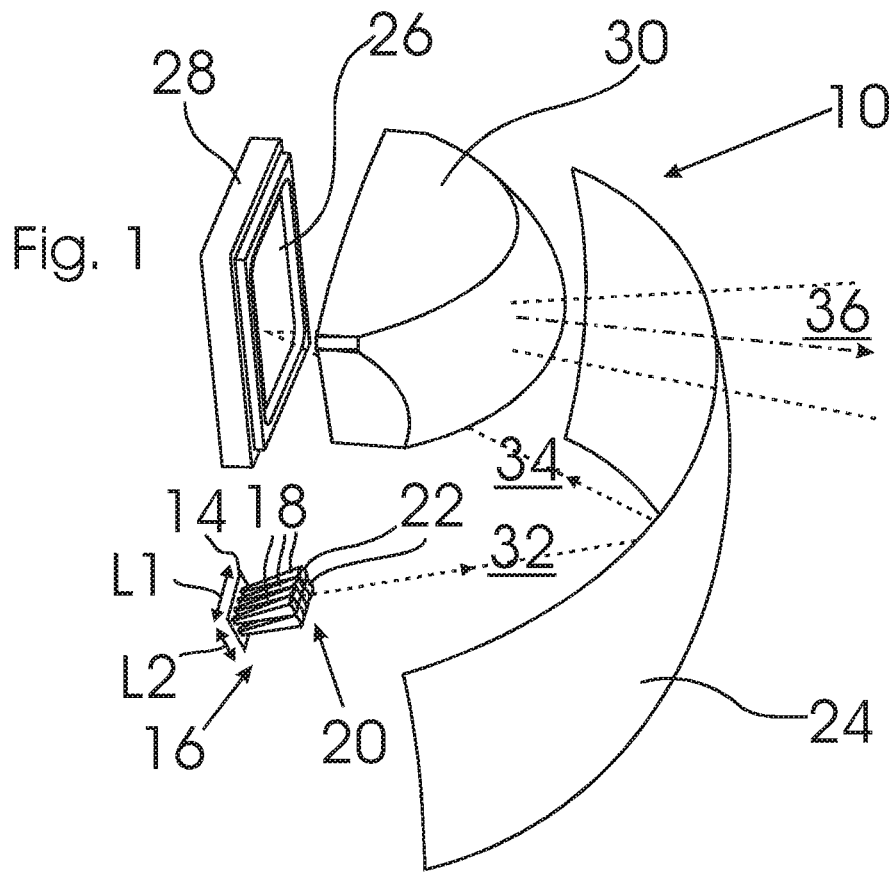
FIG. 1 shows a perspective view if elements of a vehicle headlight.

FIG. 1 shows in a perspective view the arrangement of elements in a lighting arrangement 10 which may serve as vehicle headlight. In the drawings, the elements are shown for illustration purposes in their relative arrangement only, without a housing or mounting elements. As the skilled person will understand, all elements will be securely mounted and enclosed in a housing in actual embodiments.

LED elements 12 (not visible in FIG. 1, but shown e. g. in FIG. 3) on a PCB 14 generate light that is collimated by a collimator 16 formed of individual collimator elements 18. Collimated light 32 emitted from a common light output surface 20 formed of individual light output surfaces 22 of the collimator elements 18 is projected by a concave reflector 24 as a projected beam 34 onto a DMD surface 26 of a DMD device 28.

In a manner known per se, micromirrors (not shown) on the DMD surface 26 selectively reflect the projected light 34, depending on the individual position of each micromirror element. A large number of micromirrors is controllably movable between a first "on" position where the mirror surface is oriented under a first angle to the surface 26 and a second "off position" where the micromirror is rotated around a switching axis relative to the "on" position, such that the mirror surface is oriented under a second angle to the surface 26.

Figure 2:
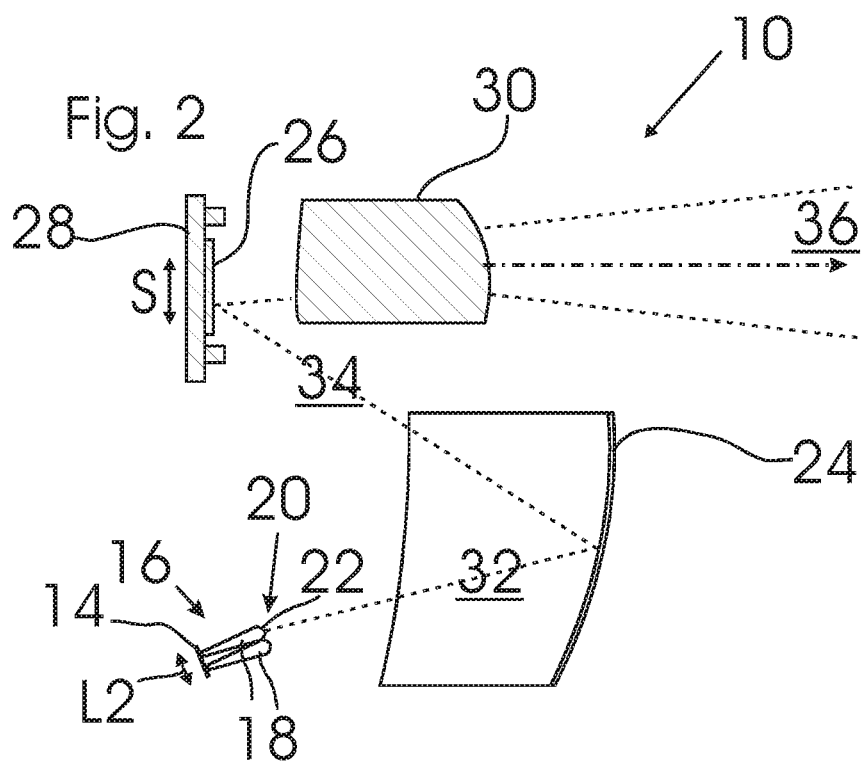
FIG. 2 shows the elements of FIG. 1 in cross-section.

In the arrangement according to the embodiment, the DMD device 28 has a switching direction S, i.e. the micromirrors thereon are rotatable around individual switching axes perpendicular to the switching direction S indicated in FIG. 2.

For micromirror elements in the "on" position, the incident projected light 34 is reflected onto a projection lens 30 to be projected as illumination beam 36. For all micromirror elements in the "off" position, the incident projected light 34 is reflected elsewhere and does not contribute to the projected illumination beam 36.

The LED elements 12 are arranged on the PCB 14 in a 2×4 Matrix. The array of LED elements 12 constitutes a distributed light source. The LED elements 12 in the example are Lambertian emitters. Light emitted from the LED elements 12 is collimated and thus formed into a collimated light beam 32 with a narrowed emission angle by the collimator 16.

The shape of the collimator 16 and the individual collimator elements 18 is visible in particular from FIG. 3, FIG. 4. The collimator 16 comprises one collimator element 18 made e.g. of silicone for each of the LED elements 12. The LED elements 12 each have a square light emitting surface. Directly in front of the light emitting surface of each LED element 12, a light input surface 40 of the respective collimator element 18 is arranged, such that good optical coupling is ensured.

The collimator elements 18 are each formed as solid transparent bodies of frustum shape with edges 42 extending from the corners of the square light input surfaces 40 to the corners of the light output surfaces 22. While the light input surfaces 40 are plane, the light output surfaces 22 in the example shown have a slightly convex shape. Side surfaces of the collimator elements 18 constitute boundary surfaces from the solid material of the collimator elements 18 to the surrounding air. Thus, for light incident under small angles to the side surfaces, total internal reflection occurs, such that the side surfaces effectively constitute reflector surfaces.

As visible in FIG. 4, the light output surfaces 22, while being of convex shape, are bordered by edges 44 forming a rectangle, so that the light output surfaces 22 may be considered substantially rectangular. The light output surfaces 22 have a larger area than the light input surfaces 40. By the shape of the collimator elements 18, the shape and size of the light emitting surface is thus transformed.

Each collimator element 18 also transforms the aspect ratio from the light input surfaces 40—which in this example are square—to the light output surfaces 22, which in this example have a rectangular shape with a first, smaller width d1 and second larger width d2, as shown in FIG. 4. The light output surfaces 22 thus each are asymmetrical with an aspect ratio d1/d2.

In the resulting collimated beam 32 emitted from the light output surfaces 22 the beam divergence in the direction of d1 is greater than in the direction of d2.

The individual light output surfaces 22 are arranged with edges 44 directly adjacent to form a continuous common light output surface 20 with a width L1 and a height L2. The size, and in particular the aspect ratio L1/L2 of the common light output surface 20 of the collimator 16 is determined by the array of LEDs 12, i.e. the number of rows/columns and relative spacing of the LED elements 12 and the change of size/aspect ratio introduced by the shape of the collimator elements 18. In the example shown, the array comprises two rows of LED elements 12. Further, in the present example each row comprises four LED elements 12. As the skilled person will under-stand, in different embodiments different numbers of rows will be provided, such as e.g. only one row or three or more. Further, a different number of LED elements 12 per row may be provided, such as e.g. 5, 6 or more.

The LED elements 12 may e.g. have a light emitting surface 40 of 0.7×0.7 mm. The spacing along the rows may be e.g. such that the distance between adjacent LED elements 12 is 1 mm. The spacing of the rows may be e.g. 1.7 mm. The aspect ratio d1/d2 of each light output surface 22 in the preferred example may be e.g. 1:1.4.

In the example as shown, the aspect ratio L1/L2 of the common light output surface 20 may be e.g. 1.4:1. As shown, the width L1 of the light output surface 20 is greater than the width L2 perpendicular thereto.

Again, the skilled person will recognize that any desired size and aspect ratio of the common light output surface 20 may be achieved by the appropriate choice of number and arrangement of LED lighting elements 12 and transformation via the size and aspect ratio of the light output surfaces 22.

In the example, the size and aspect ratio of the common light output surface 20 is chosen such that a projected beam of light 34 has the same aspect ratio as the DMD surface 26. The magnification may be chosen such that the projected beam of light 34 covers the entire DMD surface 26. However, in alternative embodiments other magnifications could be chosen.

The micromirror elements on DMD surface 26 have a common switching direction S, i.e. they may be moved between the first "on" position and the second "off" position by rotation around a switching axis perpendicular to the switching direction S. It has proven advantageous to form and project the projected beam 34 such that on the DMD surface 26 the longer extension d2 of the individual light output surfaces 22 together forming the collimated beam 32 and projected beam 34, which is parallel to the direction of L2 is arranged perpendicular to the switching axis around which the micro-mirror elements rotate, and the shorter extension d1 of the individual light output surfaces 22, parallel to the direction of L1, is arranged in parallel to the switching axis, i.e. perpendicular to the switching direction. This will in consequence reduce the beam width in this direction and cause a higher contrast for each switched pixel.

In operation of the lighting arrangement 10, the characteristics and light distribution of the projected illumination beam 36 may be controlled by a combination of two different measures. For one, the LED elements 12 may be individually controlled to be on or off. This may be effected by a control circuit (not shown) connected to the LED element 12 on the PCB 14 to selectively control operation thereof. In addition, the micromirror elements on the DMD surface 26 may be controlled by the same control circuit or by a different circuit, so that the micromirror elements are positioned in "on" or "off" positions according to a desired pattern. The resulting illumination beam 36 depends on control both of the pattern of activated LED elements 12 and the pattern of micromirror elements on the DMD surface 26 being in either "on" or "off" position.

FIG. 5 shows (in a simplified manner for illustration purposes) an example of an illumination beam 36 projected onto a plane surface. In the example shown, the illumination beam 36 is represented as a matrix of 2×4 squares 50 (dashed lines), corresponding to the projected and reflected output surfaces 22 of the individual collimator elements 18 and therefore to the individual LED elements 12. Each square 50 is in turn divided into 4×4 pixels 52, 54, corresponding to the micromirror elements on the DMD surface

26. As the skilled person will recognize, the actual DMD resolution may vary significantly for different embodiments, but will in most cases be significantly higher than the 16×8 pixels represented in FIG. 5.

In FIG. 5, active pixels 54, corresponding to micromirror elements in the "on" position and thus being lit regions of the projected illumination beam 36, are shown as white squares, whereas non-active pixels 52, corresponding to dark, non-lit regions of the illumination beam 36, are shown in a hatched representation.

The illumination beam 36 comprises, in the example dark regions 56, 58. The dark region 56 in the upper left corner, corresponds to the upper left square 50. While the dark region 56 may be achieved by controlling all corresponding micromirror elements to move into the "off" position, it is preferred to deactivate the top left LED element 12 on the PCB 14 instead, so that no light is emitted from the light output surface 40 of the top left collimator element 18 and the corresponding regions of the collimated beam 32 and projected beam 34 already comprise a dark region 56 of this shape.

Further, the exemplary illumination beam 36 comprises an odd shaped second dark region 58 shown to the right in FIG. 5. The second dark region 58 has portions thereof extending into four different squares 50 without completely covering these squares 50. Therefore, in order to achieve this distribution, the LED elements 12 corresponding to the four squares 50 are active, and the pixels 52, 54 of the DMD element 28 are spatially controlled to achieve the desired shape of the second dark region 58.

FIG. 6 shows schematically use of the lighting arrangement 10 in a front headlight of a motor vehicle 60. The projected illumination beam 36 with the light distribution e.g. corresponding to the example of FIG. 5 may thus be controlled to contain dark regions 56, 58 to avoid glare, e.g. for on-coming traffic positioned into the direction of the dark areas 56, 58.

It should be noted that the above mentioned embodiments illustrate rather than limit the invention, and that those skilled in the art will be able to design many alternative embodiments without departing from the scope of the claims.

In particular, the number of LED elements 12 and relative arrangement thereof on the PCB 14 may be chosen differently, e.g. to obtain a different size or aspect ratio of the common light output surface 20. Also, the size and resolution of the DMD device 28 may be chosen differently as required in a particular embodiment. Further, differently shaped collimator elements, in particular with light input surfaces 40 and light output surfaces 22 of different size, shape and aspect ratio may be chosen.

While in the above example a desired shape of a projected illumination beam 36 was achieved by either turning the individual LED elements 12 on or off, it is also possible to operate one or more of the LED elements 12 in dimmed states. Dimming of LED elements 12 may be achieved either by control of operating current and/or operating voltage to reduced values, or—preferably—by pulse width modulation. By using dimmed operation of LED elements, the corresponding regions in the resulting projected illumination beam receive less light.

In the claims, any reference signs shall not be construed as limiting the claims. The word "comprising" does not exclude the presence of elements or steps other than those listed in the claims. The indefinite article "a" or "an" proceeding an element does not exclude the presence of a plurality of such elements. The mere fact that certain measures are recited in mutually different dependent claims does not indicate that a combination of these measures cannot be used to advantage.

What is claimed is:

1. A lighting arrangement, comprising:
   a plurality of LED lighting elements,
   a plurality of collimator elements arranged to collimate light emitted from the lighting elements wherein the light output surfaces of the collimator elements have a first extension in a first direction and a second extension in a second direction perpendicular to the first direction, the second extension being larger than the first extension;
   a spatially controllable reflector element comprising a plurality of reflector elements adjustable at least between a first and second position, wherein the spatially controllable reflector element has a switching direction of the reflector elements,
   a first projection element arranged to project light emitted from the collimator elements onto the spatially controllable reflector element,
   a second projection element,
   wherein in the first position of the reflector elements the light from the first projection element is reflected into the direction of a second projection element to form a projected illumination beam,
   wherein in the second position of the reflector elements the light is reflected into a different direction to not contribute to the projected illumination beam, and
   wherein the second extension is arranged in parallel to the switching direction.

2. The lighting arrangement according to claim 1, wherein the LED lighting elements are arranged on a carrier spaced from each other.

3. The lighting arrangement according to claim 1, wherein the collimator elements each comprise a light input surface arranged next to the LED lighting elements and an opposite light output surface.

4. The lighting arrangement according to claim 3, wherein the light output surfaces are larger than the light input surfaces.

5. The lighting arrangement according to claim 3, wherein the quotient of the first and second extension of the light output surfaces differs from the quotient of a first and a second extension of the light input surfaces.

6. The lighting arrangement according to claim 3, wherein light emitted from the collimator elements onto the spatially controllable reflector element is adapted to the size, aspect ratio and angular orientation of the spatially controllable reflector element.

7. The lighting arrangement according to claim 3, wherein the light output surfaces of the collimator elements are arranged directly adjacent to each other forming a common light output surface.

8. The lighting arrangement according to claim 3, wherein the collimator elements are at least substantially frustum shaped with edges extending from corners of a rectangular light input surface to corners of the light output surface.

9. The lighting arrangement according to claim 3, wherein the light output surfaces have a convex shape.

10. The lighting arrangement according to claim 1, wherein the first projection element comprises at least one concave reflector surface.

11. The lighting arrangement according to claim 1, wherein the second projection element comprises at least one projection lens.

12. The lighting arrangement according to claim 1, wherein the LED lighting elements are electrically connected to be operable independently.

13. The lighting device according to claim 1, wherein the LED lighting elements are arranged in an array comprising at least two parallel rows of spaced LED lighting elements, the two rows being arranged at a distance from each other.

\* \* \* \* \*